United States Patent Office 3,793,332
Patented Feb. 19, 1974

3,793,332
2-CYANO ALKYLBENZOMORPHAN DERIVATIVES AND SALTS THEREOF
Toshio Atsumi, Saitama-ken, Kenji Kobayashi and Yoshiaki Takebayashi, Takarazuka, and Hisao Yamamoto, Nishinomiya, Japan, assignors to Sumitomo Chemical Company, Limited, Osaka-shi, Japan
No Drawing. Filed May 22, 1972, Ser. No. 255,805
Int. Cl. C07d 39/00
U.S. Cl. 260—293.54                                   9 Claims

ABSTRACT OF THE DISCLOSURE

Benzomorphan derivatives of the formula:

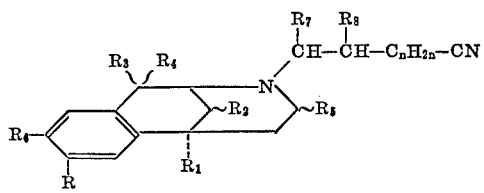

wherein R is a hydrogen atom, a hydroxyl group, an alkoxy group or an acyloxy group; $R_1$ is a hydrogen atom, an alkyl group, a phenyl group, a halophenyl group, an alkylphenyl group, an alkoxyphenyl group, a trifluoromethylphenyl group, an alkylthiophenyl group or a group of the formula: $(C_mH_{2m-p+1})-(R_9)_p$ (wherein $m$ is an integer of 1–6, $p$ is an integer of 1–2 and $R_9$ is an alkoxy group); $R_2$ is a hydrogen atom or an alkyl group; $R_3$ is a hydrogen atom, an alkyl group, a phenyl group or an alkoxyphenyl group; $R_4$ is a hydrogen atom or a hydroxyl group, or $R_3$ and $R_4$ may form an alkylidene group or a carbonyl group together with a carbon atom to which these substituents are bonded; $R_5$ is a hydrogen atom or an alkyl group; $R_6$ is a hydrogen atom or a methyl group; $R_7$ and $R_8$ are independently a hydrogen atom or an alkyl group; and $n$ is an integer of 0–2, and acid addition salts thereof, which are useful as non-addicting, analgesic and pain-relieving agents. These benzomorphan derivatives are prepared by reacting a 6,7-benzomorphan derivative of the formula:

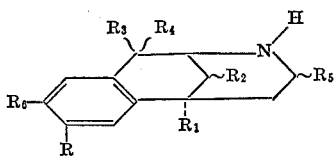

wherein R, $R_1$, $R_2$, $R_3$, $R_4$, $R_5$ and $R_6$ are each as defined above with a cyanide derivative of the formula:

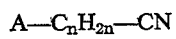

wherein $n$ is as defined above and A is a group of the formula:

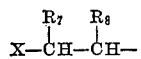

(wherein $R_7$ and $R_8$ are each as defined above and X is a halogen atom), or $n$ is 0 and A is a group of the formula

(wherein $R_7$ and $R_8$ are each as defined above).

The present invention relates to novel 2-cyanoalkylbenzomorphan derivatives and their acid addition salts, which are useful as non-addicting, analgesic and pain-relieving agents, and their production and compositions containing them.

Hitherto, many benzomorphan derivatives (e.g. phenazocine, pentazocine) have been developed as analgesic drugs but most of them have addiction and produce narcotic symptoms such as cessation of locomotor activity and stupor at their usual dosages. The products of the invention do not show any drug dependency in animal tests.

Accordingly, a main object of the present invention is to provide benzomorphan derivatives which are useful as analgesic and pain-relieving agents without addiction.

The present invention provides a novel 2-cyanoalkyl-6,7-benzomorphan derivative of the formula:

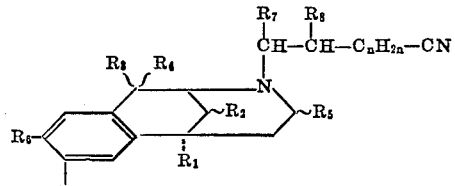

wherein R is a hydrogen atom, a hydroxyl group, a $C_1$–$C_3$ alkoxy group or an acyloxy group such as $C_1$–$C_8$ alkanoyloxy; $R_1$ is a hydrogen atom, a $C_1$–$C_5$ alkyl group, a phenyl group, a halophenyl group, an alkylphenyl group (wherein the alkyl moiety has 1 to 3 carbon atoms), an alkoxyphenyl group (wherein the alkoxy moiety has 1 to 3 carbon atoms), a trifluoromethylphenyl group, an alkylthiophenyl group (wherein the alkylthio moiety has 1 to 3 carbon atoms) or a group of the formula:

$$(C_mH_{2m-p+1})-(R_9)_p$$

(wherein $m$ is an integer of 1–6, $p$ is an integer of 1–2 and $R_9$ is a $C_1$–$C_3$ alkoxy group); $R_2$ is a hydrogen atom or a $C_1$–$C_3$ alkyl group; $R_3$ is a hydrogen atom, a $C_1$–$C_3$ alkyl group, a phenyl group or an alkoxyphenyl group (wherein the alkoxy moiety has 1 to 3 carbon atoms); $R_4$ is a hydrogen atom or a hydroxyl group, or $R_3$ and $R_4$ may form a $C_1$–$C_3$ alkylidene group or a carbonyl group together with a carbon atom to which these substituents are bonded; $R_5$ is a hydrogen atom or a $C_1$–$C_3$ alkyl group; $R_6$ is a hydrogen atom or a methyl group; $R_7$ and $R_8$ are independently a hydrogen atom or a $C_1$–$C_2$ alkyl group; and $n$ is an integer of 0–2, and its acid addition salts.

This invention further provides a process for producing the 2-cyanoalkyl-6,7-benzomorphan derivative [I], which comprises reacting a 6,7-benzomorphan derivative of the formula:

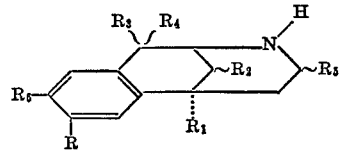

wherein R, $R_1$, $R_2$, $R_3$, $R_4$, $R_5$ and $R_6$ are each as defined above with a cyanide derivative of the formula:

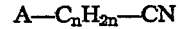

wherein $n$ is as defined above and A is a group of the formula:

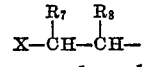

(wherein $R_7$ and $R_8$ are each as defined above and X is a halogen atom), or $n$ is 0 and A is a group of the formula:

(wherein $R_7$ and $R_8$ are each as defined above).

The invention furthermore provides a novel pharmaceutical composition containing an analgesically effective amount of the 2-cyanoalkyl-6,7-benzomorphan derivative [I] as an active ingredient and a pharmaceutically acceptable carrier or diluent.

The starting 6,7-benzomorphan derivative [II] is known and can be prepared by demethylating the corresponding 2-methyl-6,7-benzomorphan derivative. Thus, for example, United States patent specification No. 3,138,603 discloses a process shown by the following formulae:

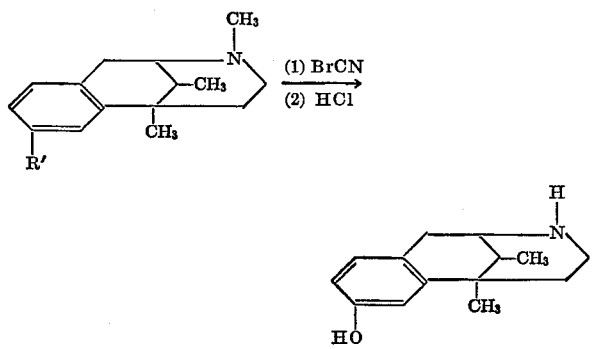

wherein R' is a methoxy group or an acetoxy group.

For the production of the 2-methyl-6,7-benzomorphan derivative represented by the formula:

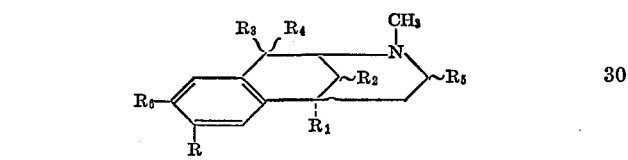

wherein R, $R_1$, $R_2$, $R_3$, $R_4$, $R_5$ and $R_6$ are each as defined above, there are known some processes, among which a typical process is shown in the following scheme:

Scheme 1

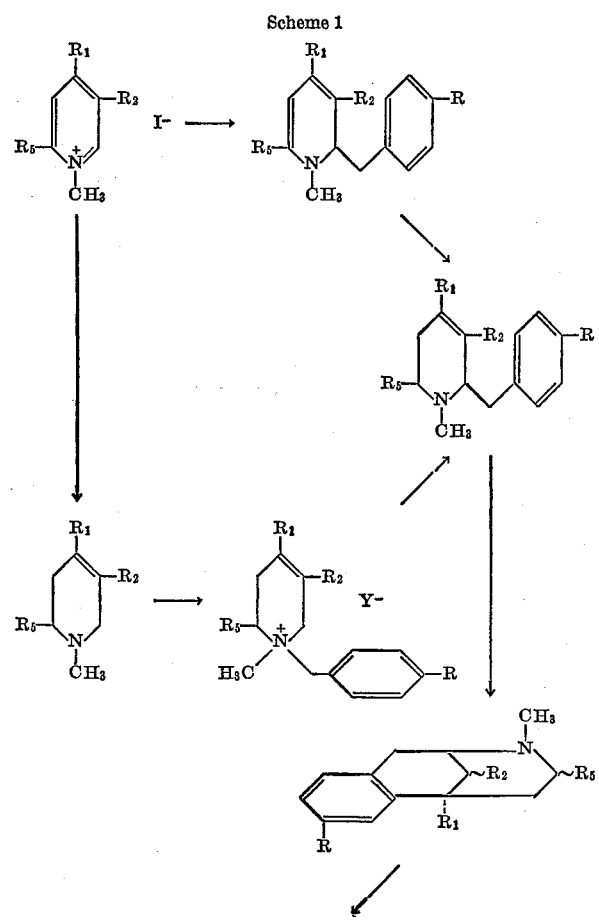

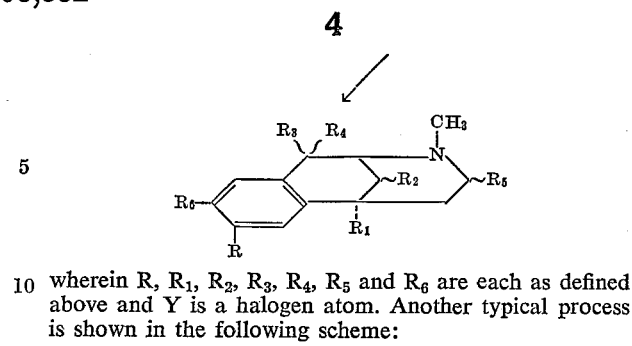

wherein R, $R_1$, $R_2$, $R_3$, $R_4$, $R_5$ and $R_6$ are each as defined above and Y is a halogen atom. Another typical process is shown in the following scheme:

Scheme 2

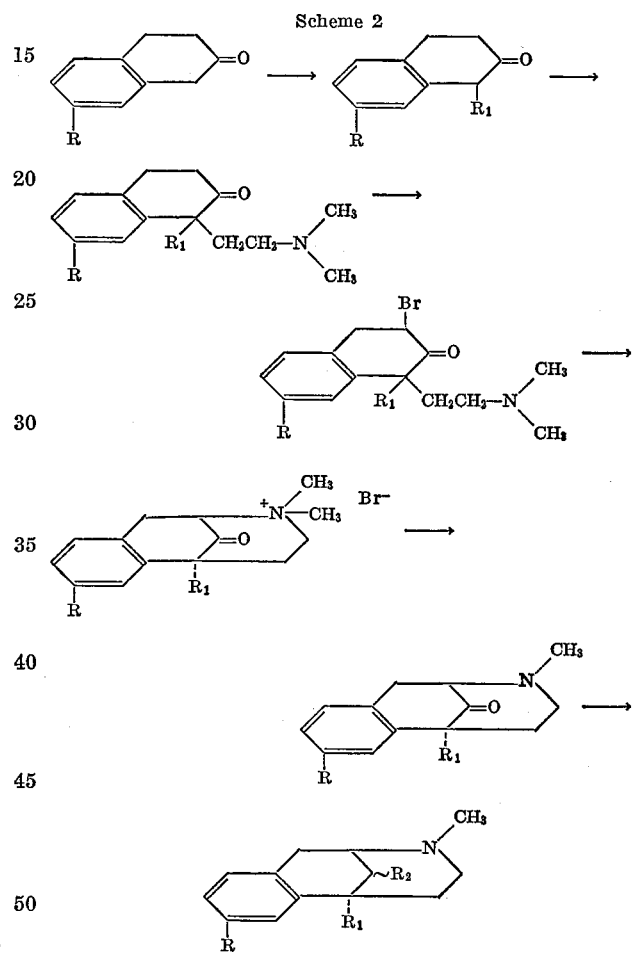

wherein R, $R_1$ and $R_2$ are each as defined above.

The reaction of the 6,7-benzomorphan derivative [II] with the cyanide derivative [III: $n=0-2$;

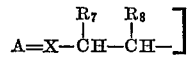

$$A=X-\overset{R_7}{\underset{|}{C}}H-\overset{R_8}{\underset{|}{C}}H-]$$

is usually carried out in an inert solvent (e.g. n-hexane, benzene, toluene, xylene, chloroform, dimethylformamide, methanol, ethanol, isopropanol). The presence of a basic substance (e.g. sodium carbonate, potassium carbonate, sodium bicarbonate, potassium bicarbonate, sodium hydroxide, potassium hydroxide, sodium amide, sodium hydride, pyridine, triethylamine) in the reaction is preferred. The reaction proceeds at a temperature of 20 to 200° C., preferably 50 to 150° C. The reaction product is readily recovered from the reaction mixture by a conventional separation procedure such as filtration and precipitation.

The reaction of the 6,7-benzomorphan derivative [II] with the cyanide derivative

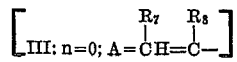

$$[III: n=0; A=\overset{R_7}{\underset{|}{C}}H=\overset{R_8}{\underset{|}{C}}-]$$

is per se novel and may be called as the modified Michael Addition. By this reaction, the 2-cyanoalkyl-6,7-benzomorphan derivative [I] can be produced in an excellent yield and a high purity by a simple operation. The reaction is carried out in the absence or presence of an appropriate solvent (e.g. methanol, ethanol, ether, chloroform, methylene chloride, benzene, toluene, xylene, dimethylformamide). Further, there may be used a catalyst, of which examples are Triton B, sodium methoxide, sodium amide, potassium hydroxide, etc. The reaction proceeds at a temperature from about room temperature to the boiling point of the solvent employed.

For the production of the 2-cyanoalkyl-6,7-benzomorphan derivative [I: R=acyloxy], the corresponding 2-cyanoalkyl-6,7-benzomorphan derivative [I: R=hydroxyl] may be acylated by a per se conventional procedure, e.g. treating with an acid anhydride or acyl halide.

When $R_2$ is alkyl, the 2-cyanoalkyl-6,7-benzomorphan derivative [I] has two stereo isomers, i.e. cis isomer ($R_2$ being $\alpha$-configuration) and trans isomer ($R_2$ being $\beta$-configuration). Each of these isomers can be separated and purified by a per se conventional procedure such as fractional crystallization, fractional distillation or column chromatography. Alternatively, each of these isomers may be produced from the corresponding cis or trans isomer of the 6,7-benzomorphan derivative [II] by reacting the same with the cyanide derivative [III]. Still, each of the said isomers has asymmetric carbon atoms, and there can be obtained four optically active isomers (i.e. (+)-cis, (−)-cis, (+)-trans, (−)-trans) by a conventional optical resolution procedure.

The 2 - cyanoalkyl-6,7-benzomorphan derivative [I] possesses a basic nitrogen atom in the fundamental structure and hence various acid addition salts thereof can be formed. The acid addition salts can be obtained by the use of organic and inorganic acids such as formic acid, acetic acid, propionic acid, butyric acid, malic acid, fumaric acid, succinic acid, glutamic acid, tartaric acid, oxalic acid, citric acid, lactic acid, maleic acid, hydroxymaleic acid, glycolic acid, gluconic acid, glucuronic acid, saccharic acid, ascorbic acid, phenylacetic acid, benzoic acid, p-aminobenzoic acid, phthalic acid, salicylic acid, anthranilic acid, p-hydroxybenzoic acid, p-aminosalicylic acid, picolinic acid, 3-hydroxy-2-naphthoic acid, 3-indolacetic acid, barbituric acid, sulfamic acid, quininic acid, tropic acid, methanesulfonic acid, ethanesulfonic acid, benzenesulfonic acid, p-toluenesulfonic acid, hydroxyethanesulfonic acid, hydrofluoric acid, hydrochloric acid, hydrobromic acid, hydroiodic acid, perchloric acid, nitric acid, sulfuric acid, phosphoric acid and the like.

According to the present invention, the following 2-cyanoalkyl-6,7-benzomorphan derivatives [I], and acid addition salts thereof, can be obtained:

2-($\beta$-cyanoethyl)-6,7-benzomorphan
2-($\beta$-cyanoethyl)-5,9-dimethyl-6,7-benzomorphan
2-($\beta$-cyanoethyl)-5-methyl-6,7-benzomorphan
2'-hydroxy-2-($\beta$-cyanoethyl)-6,7-benzomorphan
2'-hydroxy-2-($\beta$-cyanoethyl)-5-methyl-6,7-benzomorphan
2'-hydroxy-2-($\beta$-cyanoethyl)-5,8,9-trimethyl-6,7-benzomorphan
2'-hydroxy-2-($\beta$-cyanoethyl)-3,5-dimethyl-6,7-benzomorphan
2'-hydroxy-2-($\beta$-cyanoethyl)-5-phenyl-6,7-benzomorphan
2'-hydroxy-2-($\beta$-cyanoethyl)-5,9-dimethyl-8-oxo-6,7-benzomorphan
2'-hydroxy-3'-methyl-2-($\beta$-cyanoethyl)-5,9-dimethyl-6,7-benzomorphan
2'-hydroxy-2-($\beta$-cyanoethyl)-5,9-dimethyl-6,7-benzomorphan
2'-hydroxy-3'-methyl-2-($\beta$-cyanoethyl)-5,9-diethyl-6,7-benzomorphan
2'-methoxy-2-($\beta$-cyanoethyl)-5,9-dimethyl-6,7-benzomorphan
2'-acetoxy-2-($\beta$-cyanoethyl)-5,9-dimethyl-6,7-benzomorphan
2'-hydroxy-2-($\beta$-cyanoethyl)-5-($\beta$-methoxyethyl)-6,7-benzomorphan
2'-hydroxy-2-($\beta$-cyanoethyl)-5,9-diethyl-6,7-benzomorphan
2'-hydroxy-2-($\beta$-cyanoethyl)-5-methyl-9-ethyl-6,7-benzomorphan
2'-hydroxy-2-($\beta$-cyanoethyl)-5-ethyl-9-methyl-6,7-benzomorphan
2'-hydroxy-2-($\alpha$-methyl-$\beta$-cyanoethyl)-5-methyl-6,7-benzomorphan
2'-hydroxy-2-($\alpha$-methyl-$\beta$-cyanoethyl)-5,9-dimethyl-6,7-benzomorphan
2'-hydroxy-2-($\beta$-methyl-$\beta$-cyanoethyl)-5-methyl-6,7-benzomorphan
2'-hydroxy-2-($\beta$-methyl-$\beta$-cyanoethyl)-5,9-dimethyl-6,7-benzomorphan
2'-hydroxy-2-($\alpha$-ethyl-$\beta$-cyanoethyl)-5,9-dimethyl-6,7-benzomorphan
2'-methoxy-2-($\alpha$-methyl-$\beta$-cyanoethyl)-5,9-dimethyl-6,7-benzomorphan
2'-hydroxy-2-($\beta$-cyanoethyl)-9-methyl-6,7-benzomorphan
2'-hydroxy-2-($\gamma$-cyanopropyl)-5,9-dimethyl-6,7-benzomorphan
2'-methoxy-2-($\gamma$-cyanopropyl)-5,9-dimethyl-6,7-benzomorphan
2'-methoxy-2-($\beta$-methyl-$\gamma$-cyanopropyl)-5,9-dimethyl-6,7-benzomorphan
2'-acetoxy-2-($\gamma$-cyanopropyl)-5,9-dimethyl-6,7-benzomorphan
2'-acetoxy-2-($\beta$-methyl-$\gamma$-cyanopropyl)-5,9-dimethyl-6,7-benzomorphan
2-($\gamma$-cyanopropyl)-5,9-dimethyl-6,7-benzomorphan
2-($\beta$-methyl-$\gamma$-cyanopropyl)-5,9-dimethyl-6,7-benzomorphan
2'-hydroxy-2-($\gamma$-cyanopropyl)-5-methyl-6,7-benzomorphan
2'-hydroxy-2-($\gamma$-cyanopropyl)-9-methyl-6,7-benzomorphan
2'-hydroxy-2-($\gamma$-cyanopropyl)-6,7-benzomorphan
2-($\gamma$-cyanopropyl)-5-methyl-6,7-benzomorphan
2-($\gamma$-cyanopropyl)-6,7-benzomorphan
2'-hydroxy-2-($\gamma$-cyanopropyl)-5,8,9-trimethyl-6,7-benzomorphan
2'-hydroxy-3'-methyl-2-($\gamma$-cyanopropyl)-5,9-dimethyl-6,7-benzomorphan
2'-hydroxy-2-($\gamma$-cyanopropyl)-5,9-dimethyl-8-oxo-6,7-benzomorphan
2'-hydroxy-2-($\gamma$-cyanopropyl)-3,5-dimethyl-6,7-benzomorphan
2'-hydroxy-2-($\gamma$-cyanopropyl)-5-phenyl-6,7-benzomorphan
2'-hydroxy-2-($\gamma$-cyanopropyl)-5-($\beta$-methoxyethyl)-6,7-benzomorphan
2'-hydroxy-2-($\delta$-cyanobutyl)-5,9-dimethyl-6,7-benzomorphan
2'-hydroxy-2-($\delta$-cyanobutyl)-6,7-benzomorphan
2'-hydroxy-2-($\delta$-cyanobutyl)-5-methyl-6,7-benzomorphan
2'-hydroxy-2-($\delta$-cyanobutyl)-5,9-dimethyl-8-methylene-6,7-benzomorphan
2'-hydroxy-3'-methyl-2-($\delta$-cyanobutyl)-5,9-dimethyl-6,7-benzomorphan
2-($\delta$-cyanobutyl)-6,7-benzomorphan, etc.

6,7-benzomorphan derivatives such as 2'-hydroxy-2,5,9-trimethyl-6,7-benzomorphan (U.S. Pat. No. 3,138,603) have a potent analgesic activity but show an addiction liability. On account of this addiction liability, these analgesics are severely restricted in a therapeutic use. Surprisingly, the 2-cyanoalkyl-6,7-benzomorphan derivatives [I] (e.g. 2'-hydroxy-2-($\beta$-cyanoethyl)-5,9-dimethyl-6,7-benzomorphan, 2'-hydroxy-2-($\beta$-cyanoethyl)-5-methyl-6,7-benzomorphan, 2'-acetoxy-2-($\beta$-cyanoethyl)-5,9-dimethyl-6,7-benzomorphan) do not show addiction in long term animal tests. When, for example, these compounds were administrated orally or subcutaneously to rats everyday for over one month, the animals did not produce any physical dependency as shown in Table I.

TABLE I

| Compound | Dose (mg./kg./day for 4 weeks) | Abstinence syndrome |
|---|---|---|
| 2'-hydroxy-2-(β-cyanoethyl)-5,9-dimethyl-6,7-benzomorphan. | 20 | — |
| 2'-hydroxy-2-(β-cyanoethyl)-5-methyl-6,7-benzomorphan. | 20 | — |
| 2-(β-cyanoethyl)-5-methyl-6,7-benzomorphan | 20 | — |
| 2'-acetoxy-2-(β-cyanoethyl)-5,9-dimethyl-6,7-benzomorphan. | 20 | — |
| Morphine | 20 | +++ |
| 2'-hydroxy-2,5,9-trimethyl-6,7-benzomorphan | 20 | ++ |

NOTE.—Groups of male rats of Wistar strain (bodyweight, 150 g.), each group consisting of 20 male rats, were subcutaneously given the test compound twice a day for 4 consecutive weeks. On the next day after drug withdrawal, the bodyweight was measured. The symbols have the following meanings: +++, severe decrease (about 5% decrease); ++, moderate decrease; +, mild decrease; —, no decrease. The marked decrease is taken as an indication of the possession of a narcotic property by the test compound.

Further, the 2-cyanoalkyl-6,7-benzomorphan derivatives [I] show a strong analgesic activity. In a subcutaneous writhing test, for instance, they exhibited much more potent analgesic action than pentazocin (i. e. 2'-hydroxy-2-(3''-methyl-2''-butenyl)-5,9-dimethyl - 6,7 - benzomorphan), which is one of the strongest, commercial analgesics, as shown in Table II.

TABLE II

| Compound: | $ED_{50}$ (mg./kg.) |
|---|---|
| 2' - hydroxy - 2 - (β-cyanoethyl)-5,9-dimethyl-6,7-benzomorphan | 0.9 |
| 2' - hydroxy - 2 - (β-cyanoethyl)-5-methyl-6,7-benzomorphan | 2.9 |
| 2' - hydroxy - 2 - (γ-cyanopropyl)-5,9-dimethyl-6,7-benzomorphan | 3.0 |
| 2' - hydroxy - 2 - (γ-cyanopropyl)-5-methyl-9-ethyl-6,7-benzomorphan | 0.85 |
| 2' - acetoxy - 2 - (β-cyanoethyl)-5,9-dimethyl-6,7-benzomorphan | 0.3 |
| Morphine | 1.4 |
| Methylmorphine | 14.0 |
| 2'-hydroxy-2,5,9-trimethyl-6,7-benzomorphan | 3.5 |
| Pentazocine (2' - hydroxy - 2 - (3''-methyl-2''-butenyl)-5,9-dimethyl-6,7-benzomorphan) | 17.5 |

Note: The test was based on the specific antagonism of the test compound to the typical syndrome produced by intraperitoneal injection of 0.6% aqueous acetic acid. The syndrome was characterized by intermittent contractions of the abdomen, twisting and turning of the trunk and extension of the hind legs. A group of 5 mice was used for each dose level. The test compound was administered subcutaneously 20 minutes before the injection of acetic acid. The number of mice which showed no pain response was recorded. The $ED_{50}$ value was calculated according to the Litchfeld-Wilcoxon's method.

The 2-cyanoalkyl-6,7,-benzomorphan derivatives [I] can be prepared for use by dissolving under sterile conditions a salt form of them in water (or an equivalent or more amount of a pharmaceutically acceptable acid if the free base is used instead of the salt), or in a physiologically compatible aqueous medium such as saline, and stored in ampoules for use by injection. Alternatively, they can be incorporated in unit dosage (1–15 mg.) form as tablets or capsules for oral administration either alone or in combination with suitable adjuvants such as calcium carbonate, starch, lactose, talc, magnesium stearate and gum acacia.

Practical and presently preferred embodiments of the present invention are shown in the following examples. Modifications of the procedures shown in these examples will be obvious to those skilled in the art, and these examples do not limit the scope of the invention.

EXAMPLE 1

2'-hydroxy-2-(β-cyanoethyl)-5,9-dimethyl-6,7-benzomorphan

A mixture of 1.1 g. of 2'-hydroxy-5,9-dimethyl-6,7-benzomorphan, 0.5 g. of sodium bicarbonate, 0.42 g. of β-chloropropionitrile and 20 ml. of dimethylformamide is stirred at 120–160° C. for 4 hours. The precipitate produced is filtered off. The filtrate is concentrated under reduced pressure to remove the dimethylformamide, and water is added thereto. The precipitate obtained is recrystallized from methanol to yield 2'-hydroxy-2-(β-cyanoethyl)-5,9-dimethyl-6,7-benzomorphan, M.P. 165.5° C.

IR $\nu^{cm^{-1}}_{paraffin}$: 2640, 2240 1610, 1580, 1495, 1240

Analysis.—Calcd. for $C_{17}H_{22}N_2O$: C, 75.52; H, 8.20; N, 10.36%. Found: C, 75.40; H, 8.13; N, 10.31%.

EXAMPLE 2

2'-hydroxy-2-(γ-cyanopropyl)-5,9-dimethyl-6,7-benzomorphan

To a mixture of 1.1 g. of 2'-hydroxy-5,9-dimethyl-6,7-benzomorphan, 0.5 g. of sodium bicarbonate and 20 ml. of dimethylformamide is added 0.52 g. of γ-chlorobutyronitrile. The resultant mixture is stirred at 120–160° C. for 4.5 hours. The solvent is removed under reduced pressure to leave a residue, to which water is added. The mixture is extracted with ether, and the extract is washed, dried over anhydrous sodium sulfate and filtered. The filtrate is concentrated to dryness to give 2'-hydroxy-2-(γ-cyanopropyl)-5,9-dimethyl-6,7-benzomorphan as a viscous liquid.

IR $\nu^{cm^{-1}}_{liq.}$: 2250, 1670 (weak), 1613, 1585, 1500

T. L. C. (silica gel) Rf value: 0.55 (acetone).

EXAMPLE 3

2'-acetoxy-2-γ-cyanopropyl)-5,9-dimethyl-6,7-benzomorphan

A mixture of 1.2 g. of 2'-hydroxy-2-(γ-cyanopropyl)-5,9-dimethyl-6,7-benzomorphan hydrochloride, 0.31 g. of anhydrous sodium acetate and 10 ml. of acetic anhydride is stirred at 100–120° C. for an hour, cooled and poured into ice water. The resultant mixture is made alkaline with aqueous potassium hydroxide (50%) while keeping ice cold, and the liberated base is shaken quickly into ether. The ether extract is washed, dried and filtered. The filtrate is evaporated to dryness to yield 1.25 g. of 2'-acetoxy-2-(γ-cyanopropyl)-5,9-dimethy-6,7-benzomorphan as a yellow liquid.

IR $\nu^{cm^{-1}}_{liq.}$: 2240, 1760, 1637, 1605, 1580, 1495, 1210

EXAMPLE 4

2' - hydroxy - 2 - (γ-cyanopropyl) - 5 - methyl - 9 - ethyl - 6,7-benzomorphan

To a mixture of 0.58 g. of 2'-hydroxy-5-methyl-9-ethyl-6,7-benzomorphan, 0.32 g. of sodium bicarbonate and 15 ml. of dimethylformamide is added 0.28 g. of γ-chlorobutyronitrile. The resultant mixture is refluxed for 4 hours. The precipitate produced is filtered off. The filtrate is concentrated under reduced pressure to remove the solvent, and water is added thereto. The precipitate obtained is recrystallized from ethyl acetate to give 2'-hydroxy-2-(γ-cyanopropyl) - 5 - methyl-9-ethyl-6,7-benzomorphan, M.P. 154–157° C.

IR $\nu^{cm^{-1}}_{paraffin}$: 2640, 2230, 1611, 1573, 1496, 923, 790

Analysis.—Calcd. for $C_{19}H_{26}N_2O$: C, 76.47; H, 8.78; N, 9.39%. Found: C, 76.73; H, 8.96; N, 9.19%.

EXAMPLE 5

2'-hydroxy-2-(δ-cyanobutyl)-5,9-dimethyl-6,7-benzomorphan

A mixture of 1.0 g. of 2'-hydroxy-5,9-dimethyl-6,7-benzomorphan, 0.58 g. of sodium bicarbonate, 0.59 g. of δ-chlorovaleronitrile and 15 ml. of dimethylformamide is refluxed for 4 hours. The precipitate produced is filtered off. The filtrate is concentrated under reduced pressure to leave a residue, to which water is added. The crude product is recrystallized from ethyl acetate to yield 2'-hydroxy - 2 - (δ - cyanobutyl) - 5,9 - dimethyl - 6,7 - benzomorphan, M.P. 158–161° C.

IR $\nu_{paraffin}^{cm^{-1}}$: 2600, 2225, 1610, 1575, 1495, 1270, 860, 802, 775

*Analysis.*—Calcd. for $C_{19}H_{26}N_2O$: C, 76.47; H, 8.78; N, 9.39%. Found: C, 76.31; H, 8.79; N, 9.21%.

EXAMPLE 6

2-(β-cyanoethyl)-5-methyl-6,7-benzomorphan

A solution of 1.0 g. of 5-methyl-6,7-benzomorphan in 20 ml. of absolute ether is added dropwise to 20 ml. of acrylonitrile at room temperature. The resultant mixture is refluxed for 20 minutes and concentrated to dryness to give 2-(β-cyanoethyl)-5-methyl-6,7-benzomorphan as a brown oil. This free base is converted to the hydrochloride by treating with methanol-hydrochloric acid. The hydrochloride is recrystallized from acetone-methanol to give 2-(β-cyanoethyl)-5-methyl-6,7-benzomorphan hydrochloride, M.P. 213.5–215.0° C.

IR $\nu_{paraffin}^{cm^{-1}}$: 2420, 2240

*Analysis.*—Calcd. for $C_{16}H_{21}N_2Cl$: C, 69.42; H, 7.64; N, 10.12; Cl, 12.81%. Found: C, 69.72; H, 7.73; N, 10.10; Cl, 12.16%.

EXAMPLE 7

2-(β-cyanoethyl)-5,9-dimethyl-6,7-benzomorphan

A mixture of 2.01 g. of 5,9-dimethyl-6,7-benzomorphan, 40 ml. of absolute ether and 0.55 g. of acrylonitrile is refluxed for one hour and concentrated to a yellow residue, which is distilled under reduced pressure to yield 1.6 g. of 2-(β-cyanoethyl)-5,9-dimethyl-6,7-benzomorphan, B.P. 150–155° C./0.28 mm. Hg.

IR $\nu_{liq.}^{cm^{-1}}$: 2230, 1490

A solution of 2-(β-cyanoethyl)-5,9-dimethyl-6,7-benzomorphan in ether is acidified with gaseous hydrogen chloride. The precipitate produced is collected by filtration and washed with ether. Recrystallization from acetone-methanol gives 2-(β-cyanoethyl)-5,9-dimethyl-6,7-benzomorphan hydrochloride, M.P. 238–240° C. (decomposition).

IR $\nu_{paraffin}^{cm^{-1}}$: 2550, 2240, 965, 763, 750, 722

*Analysis.*—Calcd. for $C_{17}H_{23}N_2Cl$: C, 70.20; H, 7.97; N, 9.63; Cl, 12.19%. Found: C, 70.32; H, 7.95; N, 9.84; Cl, 12.34%.

EXAMPLE 8

2'-hydroxy-2-(β-cyanoethyl)-5-methyl-6,7-benzomorphan

To a solution of 1.02 g. of 2'-hydroxy-5-methyl-6,7-benzomorphan in 20 ml. of methanol is added 10 ml. of acrylonitrile. The resultant mixture is stirred at room temperature for 2 hours and concentrated to dryness to give crude 2' - hydroxy - 2 - (β - cyanoethyl) - 5 - methyl - 6,7 - benzomorphan. Recrystallization from ethyl acetate yields 2'-hydroxy-2-(β-cyanoethyl)-5-methyl-6,7-benzomorphan as prisms, M.P. 161–163° C.

IR $\nu_{paraffin}^{cm^{-1}}$: 2600, 2240, 1610, 1580, 1500

*Analysis.*—Calcd. for $C_{16}H_{20}N_2O$: C, 74.96; H, 7.86; N, 10.93%. Found: C, 74.66; H, 7.95; N, 10.98%.

EXAMPLE 9

2'-acetoxy-2-(β-cyanoethyl)-5,9-dimethyl-6,7-benzomorphan

A mixture of 1.0 g. of 2'-hydroxy-2-(β-cyanoethyl)-5,9-dimethyl-6,7-benzomorphan and 10 ml. of acetic anhydride is stirred at 100–110° C. for one hour, cooled and poured into ice water. The mixture is made alkaline with aqueous potassium hydroxide (50%) while keeping ice cold and extracted quickly with ether. The ether extract is washed with saturated aqueous sodium chloride solution, dried over anhydrous sodium sulfate and filtered. The filtrate is concentrated to dryness to give 2'-acetoxy-2-(β-cyanoethyl)-5,9-dimethyl-6,7-benzomorphan as a yellow liquid.

IR $\nu_{liq.}^{cm^{-1}}$: 2250, 1755, 1620, 1580, 1492, 1375, 1010, 942

EXAMPLES 10 TO 12

The following compounds are obtained in accordance with the manner similar to that of Example 1:

2'-hydroxy-2-(γ-cyanopropyl)-5-methyl-6,7-benzomorphan
2' - hydroxy-3'-methyl-2-(β-cyanoethyl)-5,9-dimethyl-6,7-benzomorphan
2'-hydroxy-2-(β-cyanoethyl)-5-phenyl-6,7-benzomorphan

EXAMPLES 13 TO 15

The following compounds are obtained in accordance with the manner similar to that of Example 8:

2' - hydroxy-2-(β-cyanoethyl)-5-methyl-9-ethyl-6,7-benzomorphan
2' - hydroxy - 2 - (β-cyanoethyl) - 5 - ethyl - 9 - methyl-6,7-benzomorphan
2' - hydroxy - 2 - (β-cyanoethyl) - 5,9 - diethyl - 6,7-benzomorphan

What is claimed is:

1. A benzomorphan derivative of the formula:

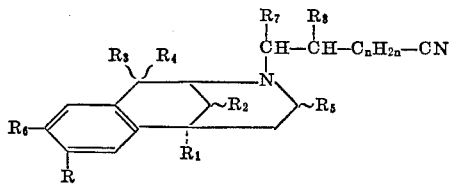

wherein R is a hydrogen atom, a hydroxyl group, a $C_1$–$C_3$ alkoxy group or $C_1$–$C_8$ alkanoyloxy group; $R_1$ is a hydrogen atom, a $C_1$–$C_5$ alkyl group, a phenyl group, a halophenyl group, an alkylphenyl group (wherein the alkyl moiety has 1 to 3 carbon atoms), an alkoxyphenyl group (wherein the alkoxy moiety has 1 to 3 carbon atoms), a trifluoromethylphenyl group, an alkylthiophenyl group (wherein the alkylthio moiety has 1 to 3 carbon atoms) or a group of the formula: $(C_mH_{2m-p+1})$—$(R_9)_p$ (wherein m is an integer of 1–6, p is an integer of 1–2 and $R_9$ is a $C_1$–$C_3$ alkoxy group); $R_2$ is a hydrogen atom or a $C_1$–$C_3$ alkyl group; $R_3$ is a hydrogen atom, a $C_1$–$C_3$ alkyl group, a phenyl group or an alkoxyphenyl group (wherein the alkoxy moiety has 1 to 3 carbon atoms); $R_4$ is a hydrogen atom or a hydroxyl group, or $R_3$ and $R_4$ may form a $C_1$–$C_3$ alkylidene group or a carbonyl group together with a carbon atom to which these substituents are bonded; $R_5$ is a hydrogen atom or a $C_1$–$C_3$ alkyl group; $R_6$ is a hydrogen atom or a methyl group; $R_7$ and $R_8$ are independently a hydrogen atom or a $C_1$–$C_2$ alkyl group; and n is an integer of 0–2, or its acid addition salt.

2. A benzomorphan derivative of the formula:

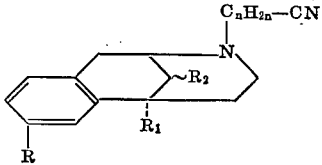

wherein R is a hydrogen atom, a hydroxyl group, a $C_1$–$C_3$ alkoxy group or an acyloxy group; $R_1$ is a hydrogen atom, a $C_1$–$C_5$ alkyl group or a phenyl group; $R_2$ is a hydrogen atom or a $C_1$–$C_3$ alkyl group; and $n$ is an integer of 2–4, or its acid addition salt.

3. 2'-hydroxy-2-($\beta$-cyanoethyl)-6,7-benzomorphan.

4. 2' - hydroxy - 2 - ($\beta$-cyanoethyl) - 5-methyl-6,7-benzomorphan.

5. 2' - hydroxy - 2 - ($\beta$-cyanoethyl) - 5,9 - dimethyl-6,7-benzomorphan.

6. 2' - hydroxy - 2 - ($\beta$-cyanoethyl) - 5,9 - diethyl-6,7-benzomorphan.

7. 2' - acetoxy - 2 - ($\beta$-cyanoethyl) - 5,9 - dimethyl-6,7-benzomorphan.

8. 2' - hydroxy - 2 - ($\gamma$-cyanopropyl) - 5,9 - dimethyl-6,7-benzomorphan.

9. 2' - hydroxy - 2 - ($\gamma$-cyanopropyl) - 5 - methyl-9-ethyl-6,7-benzomorphan.

References Cited

UNITED STATES PATENTS

| | | | |
|---|---|---|---|
| 3,372,165 | 3/1968 | Archer | 260—294.7 |
| 3,449,331 | 6/1969 | Clarke et al. | 260—240 |
| 3,449,332 | 6/1969 | Clarke et al. | 260—240 |
| 3,480,638 | 11/1969 | Block et al. | 260—294.3 |
| 3,558,638 | 1/1971 | Clarke et al. | 260—294.3 |
| 3,634,433 | 1/1972 | Moriyama et al. | 260—293.54 |
| 3,639,407 | 2/1972 | Clarke et al. | 260—293.54 |
| 3,639,410 | 2/1972 | Albertson et al. | 260—293.54 |

HENRY R. JILES, Primary Examiner

G. T. TODD, Assistant Examiner

U.S. Cl. X.R.

424—267

UNITED STATES PATENT OFFICE
CERTIFICATE OF CORRECTION

Patent No. 3,793,332      Dated February 19, 1974

Inventor(s) Toshio Atsumi, Kenji Kobayashi, Yoshiaki Takebayashi and Hisao Yamamoto It is certified that error appears in the above-identified patent and that said Letters Patent are hereby corrected as shown below:

In Column 1,

After line 8, insert

-- Claims priority, application Japan, May 21, 1971, 45/34896 application Japan, December 20, 1971, 46/103839 --

Signed and sealed this 13th day of August 1974.

(SEAL)
Attest:

McCOY M. GIBSON, JR.
Attesting Officer

C. MARSHALL DANN
Commissioner of Patents